US006146672A

United States Patent [19]
Gonzalez et al.

[11] Patent Number: 6,146,672
[45] Date of Patent: Nov. 14, 2000

[54] WATER-IN-OIL EMULSION FILLINGS

[75] Inventors: Juan M. Gonzalez, Santo Domingo, Dominican Rep.; Patricia W. Hahn, Plymouth, Minn.

[73] Assignee: The Pillsbury Company, Minneapolis, Minn.

[21] Appl. No.: 09/054,122

[22] Filed: Apr. 2, 1998

[51] Int. Cl.$^7$ .............................. A23D 7/00; A21D 10/00
[52] U.S. Cl. ............................ 426/94; 426/601; 426/604
[58] Field of Search .................................. 426/572, 601, 426/606, 607, 604, 94, 89, 499, 512, 514

[56] References Cited

U.S. PATENT DOCUMENTS

| | | | |
|---|---|---|---|
| 2,359,228 | 9/1944 | Lloyd et al. | 99/139 |
| 3,208,857 | 9/1965 | Howard et al. | 99/123 |
| 3,253,928 | 5/1966 | Bedenk et al. | 99/139 |
| 3,782,966 | 1/1974 | Forkner | 426/275 |
| 4,242,366 | 12/1980 | Morgan et al. | 426/554 |
| 4,310,557 | 1/1982 | Suggs et al. | 426/96 |
| 4,574,690 | 3/1986 | Chiao | 426/283 |
| 4,596,714 | 6/1986 | Brabbs | 426/94 |
| 4,612,198 | 9/1986 | Wallin | 424/94 |
| 4,623,542 | 11/1986 | Walin | 426/94 |
| 4,661,360 | 4/1987 | Smith | 426/94 |
| 4,707,374 | 11/1987 | King | 426/94 |
| 4,748,031 | 5/1988 | Koppa | 426/283 |
| 4,826,696 | 5/1989 | Wilson | 426/94 |
| 4,861,604 | 8/1989 | Tang | 426/572 |
| 4,888,192 | 12/1989 | Ramnarine | 426/283 |
| 4,919,947 | 4/1990 | Barry | 426/94 |
| 5,102,680 | 4/1992 | Glass et al. | 426/572 |
| 5,178,897 | 1/1993 | Tanaka et al. | 426/602 |
| 5,236,724 | 8/1993 | Burger | 426/94 |
| 5,366,750 | 11/1994 | Morano | 426/572 |
| 5,478,588 | 12/1995 | Talignani | 426/572 |
| 5,514,395 | 5/1996 | Burger | 426/94 |
| 5,529,801 | 6/1996 | Morano | 426/572 |
| 5,573,793 | 11/1996 | Saintain | 426/34 |
| 5,612,078 | 3/1997 | Fileti | 426/572 |
| 5,654,021 | 8/1997 | Burger | 426/94 |
| 5,723,164 | 3/1998 | Morano | 426/572 |

FOREIGN PATENT DOCUMENTS

| | | | | |
|---|---|---|---|---|
| 2 644 326 | 9/1990 | France | . | |
| 5-23094 | 7/1991 | Japan | | A21D 2/16 |
| 6-276978 | 10/1994 | Japan | | A23L 1/19 |
| WO 90/09107 | 8/1990 | WIPO | | A23D 3/00 |

OTHER PUBLICATIONS

"Reduced Fat Filling," Research Disclosure, No. 338, Jun. 1, 1992, p. 462.

"Low Calorie Puff Pastry Margarine," Research Disclosure, vol. 343, Nov. 1, 1992, p. 823.

PCT International Search Report, PCT International application No. PCT/US99/06065, mailed Sep. 7, 1999, 4 pages.

Doeden 1995 Evaluation of Mettler Automatic Dropping Point Apparatus and Statistical Comparison with Wiley Melting Point Method J. Am. Oil 52(124–127).

Food Ingredients Catalog 1997–1998 ADM Decatur Illinois pp. 28,30,32,34.

Lynch 1974 Food Emulsions, Chapter 5, in Emulsions and Emulsion Technology, Part 1 ed by KL Lissant Marcel Dekker Inc New York p 266.

Sipos 1996 Soybean Oil, Chapter 11 in Baileys Industrial Oil and Fat Products, vol. 2, 5$^{th}$ ed by Y.H. Hui John Wiley & Sons New York, 5$^{th}$ edition pp. 504–505.

Swern 1979 Baileys Industrial Oil and Fat Products vol. 1 4$^{th}$ edition John Wiley & Sons New York pp. 375, 303.

*Primary Examiner*—Carolyn Paden
*Attorney, Agent, or Firm*—Faegre & Benson LLP

[57] ABSTRACT

A spreadable water-in-oil emulsion filling is provided comprising water, a fat phase comprising with a fat with a high SFI, or a combination of fats with high and low SFI's, a mixture of emulsifiers with high and low HLB values and a stabilizer. Also provided are dough products filled with the emulsion filling of the present invention. When so filled, the dough products exhibit an enhanced shelf-life and, when baked, produce a finished product with enhanced overall product quality.

47 Claims, 1 Drawing Sheet

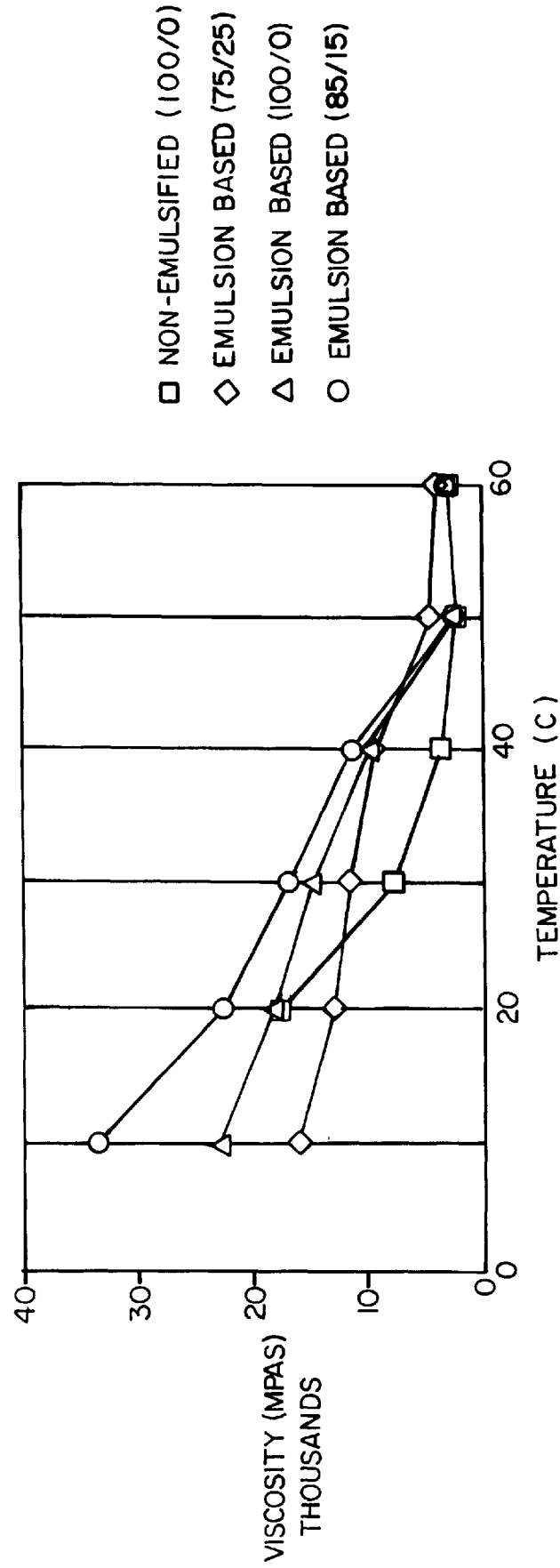

WATER-IN-OIL EMULSION FILLINGS

BACKGROUND OF THE INVENTION

Refrigerated dough products have been popular for many years and continue to gain popularity for a number of reasons. First of all, refrigerated dough products are convenient. In most cases, consumers can prepare fresh baked goods in the home in a matter of minutes simply by unwrapping, separating and baking the dough products. Additionally, performing these steps satisfies a consumer need to perform a certain amount of "hands-on baking."

Although refrigerated dough products offer many advantages and are quite popular, those refrigerated dough products which include fillings also present many drawbacks. In particular, when large amounts of hot liquid fillings are utilized in these products, it is difficult to form the dough into shapes around the filling, as the filling imparts a slipperiness to the dough and adversely affects the dough's characteristics. Thus, specialized on-line processing equipment, such as cooling tunnels, must be utilized to produce dough products which contain large amounts of filling. Also, when fillings containing water are used in refrigerated dough products other problems occur causing adverse effects on the dough's characteristics, particularly if the dough is stored prior to being baked. Also, upon baking of the dough products, moisture can migrate out of the filling into the dough. As a result, the quality of the filling is degraded and a dry, powdery, cracked layer of dry ingredients is left in the place of the previously moist filling. Furthermore, the quality of the baked product surrounding the filling may be adversely affected by the absorption of water from the filling.

Thus, there is a need for stable, moist, fillings with improved textural and organoleptic characteristics for use with refrigerated dough products.

SUMMARY OF THE INVENTION

The present invention provides a spreadable water-in-oil emulsion filling that is suitable for use as a filling for a dough product. The emulsion filling comprises about 5–60% water (also referred to herein as "the aqueous phase"); about 15–60% of a fat phase comprising from about 70–100% of a fat having a high SFI (solid fat index) and about 0–30% of a fat having a low SFI; about 0.1–1.5% of an emulsifier having a high HLB (hydrophile-lipophile balance), about 1–5% of an emulsifier having a low HLB and about 0.1–1.5% of a stabilizer.

The low SFI fat preferably has a melting point of about 45°–60° F., more preferably of about 50°–55° F. and can be any animal or vegetable fat, or mixtures thereof, with a melting point within these ranges. Preferably, the low SFI fat will be one or more vegetable fats. For example, low SFI fats suitable for use in the present emulsion filling include, but are not limited to, cottonseed oil, soybean oil, peanut oil, palm oil, corn oil, safflower oil, sunflower seed oil, canola oil and mixtures thereof. Preferably, the low SFI fat utilized is a hydrogenated soybean oil.

The high SFI fat preferably has a melting point of about 110°–140° F., more preferably, of about 120°–130° F. and can be any animal or vegetable fat, or mixtures thereof, with a melting point within these ranges. Preferably, the high SFI fat will be one or more vegetable fats. Specifically, high SFI fats suitable for use in the present invention are chosen from the same group as those suitable for use as a low SFI fat, which have been hardened or partially hydrogenized so as to achieve the desired melting point. Thus, the high SFI fats suitable for use in the present invention include, but are not limited to, cottonseed oil, soybean oil, peanut oil, palm oil, corn oil, safflower oil, sunflower seed oil, canola oil and mixtures thereof. It is preferred that the high SFI fat utilized is a hydrogenated and votated blend of soybean and cottonseed oils.

The fat phase of the emulsion filling of the present invention may comprise 100% of the high SFI fat, or alternatively, may comprise a combination of the high SFI fat and the low SFI fat. Preferably, the emulsion filling comprises a combination of low and high SFI fats. It is further preferred that the combination, or "mixture", of fats having high and low SFIs be present in the emulsion filling in an amount effective to yield a flexible continuous phase, i.e., in an amount of about 1–80%. More preferably, the mixture of fats will be present in the emulsion filling in an amount ranging from 10–70%, most preferably in an amount of about 15–60%.

The low HLB emulsifier utilized in the water-in-oil emulsion filling of the present invention may be any emulsifier with an HLB value of less than about 10. Preferably, the low HLB emulsifier has an HLB value of less than 8, and most preferably, the HLB value of the low HLB emulsifier is less than about 5. For example, low HLB emulsifiers suitable for use in the emulsion filling of the present invention include unmodified monoglycerides, mono- and diglyceride blends, triglycerol monostearate, sorbitan esters, propylene glycol fatty acid esters and lecithin. Preferably, the low HLB emulsifier utilized in the emulsion filling of the present invention is an unmodified monoglyceride, or a mono- and diglyceride blend. More preferably, the low HLB emulsifier is a mono- and diglyceride blend.

Furthermore, the high HLB emulsifier may be any emulsifier with an HLB value of about 11–20. Preferably, the high HLB emulsifier has an HLB value of about 11–18, and more preferably, the HLB value of the high HLB emulsifier is about 11–15. Thus, high HLB emulsifiers suitable for use in the present invention include ethoxylated monoglycerides, polysorbates, ethoxylated sorbitans and decaglycerol dipalmitate. Preferably, the high HLB emulsifier utilized in the emulsion filling of the present invention is an ethoxylated monoglyceride or a polysorbate. Most preferably, the high HLB emulsifier is a polysorbate commercially available under the trade name of Polysorbate 60®, from Lonza, Inc.

The mixture of emulsifiers is preferably present in an amount effective to enhance the stability of the interface between the dispersed and continuous phases of the emulsion filling, i.e., at about 1.0–10% of the emulsion filling. It is further preferred that the mixture of emulsifiers comprises a major amount of the low HLB emulsifier and a minor amount of the high HLB emulsifier. That is, a preferred ratio of the high HLB emulsifier to low HLB emulsifier is about 1:5–15, and more preferably, about 1:10. It is preferred that the dispersed aqueous phase of the emulsion filling contain about 0.1–1.5% of a hydrophilic colloid effective to stabilize said aqueous phase. The hydrophilic colloid utilized may be any edible hydrophilic colloid that is capable of stabilizing the aqueous phase when present in the aforementioned amount. Preferably, the hydrophilic colloid is selected from the group consisting of a starch (including pre-gelatinized starch and chemically-modified starch), a gum (either natural or synthetic), or a chemically-modified polysaccharide. More preferably, the hydrophilic colloid is a natural gum. Most preferably, the hydrophilic colloid is xanthan gum.

The emulsion filling of the present invention may further optionally comprise sugar and other edible ingredients, such as fruit, flavoring agents and adjuvants, that are usually considered to adversely affect dough quality when the ingredients are used in conventional fillings. These types of ingredients may be added to the continuous phase, the dispersed phase, or both. However, if these types of ingredients are included in the present emulsion filling, they are preferably present in the aqueous, or dispersed, phase.

Applicants have made the surprising discovery that the emulsion filling of the present invention, when used to fill a dough product, results in a dough product with greater overall product quality than a similar dough product filled with a conventional non-emulsified aqueous or fat-based filling. Specifically, when the emulsion filling of the present invention is used rather than a conventional non-emulsified, fat-based filling, the resulting filled dough product has (a) an improved overall product texture by virtue of the moistness, thickness and stickiness of the emulsion filling, and (b) an extended shelf life, as the emulsion filling provides a shelf-life stable, protective carrier for sensitive ingredients.

Additionally, Applicants have discovered that an emulsion filling in accordance with the present invention can be produced with a viscosity profile closely resembling the viscosity profile of a conventional, non-emulsified, fat-based filling. That is, the emulsion filling of the present invention is preferably prepared such that the emulsion filling has a viscosity in the range of from about 5000 millipascals (mpas) to about 40,000 mpas, more preferably, from about 10,000 mpas to about 30,000 mpas, at 20° C. Advantageously then, the emulsion filling of the present invention may be processed and applied to dough products with conventional filling equipment used with non-emulsified fillings.

Therefore, the present invention further provides a dough product filled with the emulsion filling of the present invention. The dough product may be any dough product that typically contains a filling, wherein it is desirable to produce a product with the aforementioned enhanced overall product quality, particularly after extended storage. For example, the dough product of the present invention may be a doughnut, a Danish pastry, a laminated pastry, a sweet roll, a Bismarck, a cookie, a bagel, a biscuit, a scone, a dinner roll, a loaf of French bread, a croissant, an egg twist, a bread stick, and the like. Furthermore, the dough product may be an unbaked dough product that is frozen, refrigerated, or fresh, or, alternatively, the dough product may be baked dough that is subsequently frozen or refrigerated, or served fresh.

All percentages used herein are weight percentages, and are based on the total weight of the water-in-oil emulsion filling unless otherwise indicated.

BRIEF DESCRIPTION OF THE FIGURES

FIG. 1 is a graph depicting a comparison of the viscosity of emulsion based fillings versus non-emulsion based fillings.

DETAILED DESCRIPTION OF THE INVENTION

As used herein, the term "filling" indicates that the emulsion filling of the present invention may be placed in an indentation in the dough surface, e.g., similar to a Bismarck or a Danish; the emulsion filling may be totally enclosed within the dough product, e.g. as is the case with a filled Bismarck, filled doughnut, filled croissant or filled cupcake, or the emulsion filling may be spread upon a dough piece after it has been rolled out, followed by rolling up the dough to form a dough product with a cross-section showing the emulsion filling in a spiral configuration, e.g., to form a sweet roll or a cinnamon roll.

The phrase "continuous phase", as is known in the art, is meant to indicate the phase that is external or continuous to the dispersed phase. For example, in the case of water-in-oil emulsions, the oil or fat phase is the continuous phase. The term "dispersed phase" refers to the phase that is dispersed into the continuous phase, which, in the case of water-in-oil emulsions, is the water portion, or the aqueous phase. There is an "interface" at the boundary between the dispersed phase and the continuous phase, the stability of which is determined by the nature of the emulsifiers used to make the emulsion.

As used herein, the phrase "structural integrity" refers to the collective physical and chemical properties of dough products which allow them to be easily handled and prepared by the consumer without breaking apart, due to such causes as weak dough seams, sogginess, dryness or other such undesirable conditions. The phrase "product quality" is meant to refer to the combination of qualities that a consumer associates with baked goods and uses to evaluate them, such as taste, texture, appearance, freshness and the like.

A. Water-in-Oil Emulsion Filling

As mentioned hereinabove, dough products that are to be prepared, filled, and then refrigerated or frozen prior to baking or reheating and consumption, typically cannot be stored for long periods of time and maintain their structural integrity and product quality. For example, a high moisture level is desirable in filled dough products, as this quality enhances the overall taste of the product and produces a desirable mouth feel. While a fresh made (i.e., bakery produced) filled dough product may have a moisture content of about 40% to 60%, the moisture content in conventional dough products that are prepared, frozen or refrigerated, and subsequently thawed or reheated and consumed is typically only about 15–20%. Thus, it has been necessary to reduce the moisture content to the aforementioned range in order to increase the shelf stability of such products and to minimize the interaction at the interface between the filling and the dough surface. Although this reduction in moisture content achieves the desired extended shelf life, the overall product quality can be reduced.

The primary contributors to the problem of product stability at the interface of the dough and conventional fillings are moisture migration from the filling to the dough, and the migration of "dough antagonists", such as acidulants, fruit, sugar, and the like, from the filling to the dough. This moisture migration causes sogginess in the dough, a change of the pastry texture and quality, and a decrease in shelf life and overall product quality. Furthermore, migration of acidic ingredients causes a change in the taste and texture of the dough, a change in the color of the filling, a change in color of the dough at the interface between the dough and the filling, and a change in the taste of the filling. Additionally, moisture migration can occur from the dough to the filling, causing deleterious effects to the filling.

Applicants have now made the surprising discovery that a dough product filled with the emulsion filling of the present invention exhibits a greater shelf life, enhanced stability, increased structural integrity and overall product quality as compared to analogous dough products filled with other non-emulsified, aqueous or fat-based fillings. Specifically, Applicants have discovered that the use of the present water-in-oil emulsion filling results in less carbon dioxide and moisture migration to the dough from the continuous phase of the filling than is observed in non-emulsified aqueous or fat-based fillings. Additionally, Applicants have discovered that, since the aqueous phase is dispersed into the oil phase in a water-in-oil emulsion, the water and its soluble ingredients, such as sucrose, acidulants and other dough antagonist ingredients, are likewise isolated from dough contact. In this manner, contact between these types of ingredients and the dough product is largely avoided, which, in turn, contributes to the observed extended shelf life and retention of desirable organoleptic properties. Finally, Applicants have discovered that an emulsion filling in accordance with the present invention can be produced with a viscosity profile closely resembling the viscosity profile of a conventional, non-emulsified, fat-based filling. That is, the emulsion filling of the present invention is preferably prepared such that the emulsion filling has a viscosity in the range of from about 5000 millipascals (mpas) to about 40,000 mpas, more preferably, from about 10,000 mpas to about 30,000 mpas, at 20° C. Advantageously then, the emulsion filling of the present invention may be processed and applied to dough products with conventional filling equipment used with non-emulsified fillings.

1. The Aqueous Phase

Preferably, the water-in-oil emulsion filling of the present invention comprises about 5–60% water. Additionally, this aqueous phase may further optionally comprise water-soluble components, such as sugar, dairy ingredients, edible acids, fruit concentrates or juices, and the like, which are selected to provide the desired flavor and textural characteristics to the filling. By using the emulsion filling of the present invention, it is possible to sequester ingredients that typically deleteriously affect dough properties so that the ingredients so sequestered are effectively limited from interacting with the dough.

2. The Fat Phase

Preferably, the water-in-oil emulsion filling of the present invention comprises from about 15–60% of a fat phase. The fat phase, in turn, may comprise 100% of the high SFI fat, or alternatively, may comprise a combination, or mixture, of the high SFI fat and the low SFI fat. Preferably, the emulsion filling comprises a mixture of low and high SFI fats, as the combination of fats, when the emulsion filling comprising the combination is used to fill a dough product, aids in the processing of the dough product and furthermore, results in the emulsion filling retaining a moist appearance after baking. The fat phase of the filling acts to inhibit water migration from the dough into the filling, and also acts to sequester any dough antagonistic agents within the dispersed phase of the emulsion.

The fats can be any animal or vegetable fats. Preferably, the fats will be a mixture of vegetable fats. For example, fats suitable for use in the present invention include, but are not limited to, cottonseed oil, soybean oil, peanut oil, palm oil, corn oil, safflower oil, sunflower seed oil, canola oil and mixtures thereof. The aforementioned fats may also be hardened or partially hydrogenated so as to achieve the desired SFI profile. Preferably, the low SFI fat utilized is a hydrogenated soybean oil. It is further preferred that the high SFI fat utilized is a hydrogenated, votated, blend of soybean and cottonseed oils.

The solid fat index is a measure of the amount of solids present at a given temperature based upon the total weight of the fat. The SFI is a commonly used means of reporting the percentage of solid fat and other material in an oil or fat, and is determined by dilatometry. The SFI profiles of the fats that are preferred for use in the present invention are shown in Table 1.

TABLE 1

Solid Fat Index (SFI) Profile of Hydrogenated Soybean Oil and Soybean/Cotton Oil

| Ingredient | Solid Fat Index (°F., %) | | | |
| --- | --- | --- | --- | --- |
| | 50° | 70° | 92° | 104° |
| Hydrogenated soybean oil | <5 | 0 | 0 | 0 |
| Hydrogenated, votated, soybean/cotton | 26 | 20 | 14 | 10 |

The utilization of a mixture of fats results in the formation of a flexible continuous phase. That is, while the use of 100% of a high SFI fat can create a rigid interfacial film susceptible to rupture, a blend of low and high SFI fats creates a continuous and stable liquid-crystal lamella capable of maintaining its flexibility upon cooling.

3. Emulsifiers

The present water-in-oil emulsion filling further comprises a mixture of low and high HLB emulsifiers. This mixture of high and low HLB emulsifiers is preferably incorporated into both the continuous and dispersed phases of the present emulsion filling to enhance the stability of the interface by creating a double layer effect. Preferably, the mixture of emulsifiers is higher in low HLB emulsifiers, so as to provide an emulsion filling with improved flavor and texture. The high and low HLB emulsifiers are preferably present in a ratio of about 1:5–15, more preferably in a ratio of about 1:10, high to low.

The HLB is an expression of the relative simultaneous attraction of an emulsifier for water and oil (the two phases of the emulsion system being considered). It is determined by the chemical composition and the extent of ionization of the emulsifier. For example, ionic emulsifiers change HLB values radically with change in pH and/or salt content of the formula, whereas nonionic HLB emulsifiers exhibit a more constant HLB under these circumstances. The HLB value of commercial emulsifiers is usually available from their suppliers, and can be approximated by observing the dispersability of the emulsifier in water. See Table 2, below.

TABLE 2

HLB of Emulsifiers by Dispersability in Water

| Dispersion Characteristics | HLB Range |
| --- | --- |
| no dispersability in water | 1–4 |
| poor dispersion | 3–6 |
| milky dispersion after vigorous agitation | 6–8 |
| stable milky dispersion | 8–10 |
| translucent to clear dispersion | 10–13 |
| clear solution | 13+ |

High HLB emulsifiers have an HLB value of about 11–20, whereas low HLB emulsifiers have an HLB value of less than about 10. Exemplary useful low HLB emulsifiers include, but are not limited to, unmodified monoglycerides, mono- and diglyceride blends, triglycerol monostearate, sorbitan esters, propylene glycol fatty acid esters, and lecithin. Exemplary high HLB emulsifiers useful in the present invention include, but are not limited to ethoxylated monoglycerides, polysorbates, ethoxylated sorbitans, and decaglycerol dipalmitate.

Preferably, the low HLB emulsifier has an HLB value of less than 8, and more preferably, the HLB value of the low HLB emulsifier is less than about 5. Most preferably, the low HLB emulsifier is a mono- and diglyceride blend with an HLB value of from about 1 to about 4. An example of such a blend is commercially available under the trade name of DurEm 104 from Van den Bergh Foods. Preferably, the high HLB emulsifier has an HLB value of from about 11 to about 18, more preferably from about 11 to about 15. Most preferably, the high 1HLB emulsifier is Polysorbate 60®, commercially available from Lonza, Inc.

4. Stabilizers

The present water-in-oil emulsion filling further comprises a stabilizer, which is preferably present in the dispersed, or aqueous, phase. Stabilizers suitable for use in the present invention are those capable of controlling water mobility, increasing the plasticity of the emulsion filling at room temperature, and improving the moist appearance and texture of the emulsion filling. Preferably, the stabilizer is an edible hydrophilic colloid, i.e., a starch (including pre-gelatinized starch and chemically-modified starch), a gum (either natural or synthetic), or a chemically-modified polysaccharide. More preferably, the stabilizer is a natural gum. Natural gums suitable for use in the present invention include but are not limited to agar, algin, carrageenan, gum arabic, gum ghatti, gum karaya, gum tragacanth, guar gum, locust bean gum and xanthan gum.

a. Starch

Starch is a high molecular weight carbohydrate of the general formula $(C_6H_{10}O_5)_n$. Starch granules exhibit a structure of concentric sheets which contain an elutable amylose fraction in the inner layers and an amylopectin fraction in the outer layers. As used herein, the term "starch" includes raw starch, pre-gelatinized starch, and chemically-modified starch. When starch granules are contacted with water and heated above a temperature designated as the gel point, the granules begin to bind water and swell. The gel temperature for a particular starch variety depends on a number of factors, including particle size, pH and absolute concentration. If the weight ratio of starch to water is high enough, the effect of exceeding the gel temperature will be to gel substantially all of the water into a thick paste.

Starches useful in the present emulsion filling may be selected from any of a wide variety of commercially available starches including but not limited to, barley, corn, potato, wheat, rice, waxy maize, sago, sorghum, arrowroot, tapioca starch or mixtures thereof. These raw starches typically have granules sized within the range of about 2–150 microns, as measured along the longest axis, and exhibit gel temperatures of about 55°–80° C. Since these starches can bind about 60–100% of their weight in water, for most applications, useful amounts of the pre-gelatinized starch will fall within the range of about 1–15%, preferably about 2–10% and most preferably about 3–7% of the total net weight of the emulsion filling.

Pregelatinized starches are useful, at least in part, because of their neutral contributions to flavor and mouthfeel in the final product. A wide variety of commercially available pregelatinized starches can be used in the water-in-oil emulsion fillings of the present invention. For example, Instant Clearjel® is available from National Starch Co. The choice of the particular pre-gelatinized starch chosen depends on the desired texture and mouthfeel of the final product.

b. Other hydrophilic colloids Additionally, useful hydrophilic colloids include chemically-modified polysaccharides, such as chemically-modified celluloses, prepared by partial hydrolysis of natural cellulose and subsequent chemical modification by etherification, carboxymethylation, or other similar reactions. Examples of chemically-modified celluloses useful in the present invention include, but are not limited to, methylcellulose, ethylcellulose, methyl ethyl cellulose, 2-hydroxyethyl ethylcellulose, 2-hydroxyethyl methylcellulose, 2-hydroxypropylcellulose, 2-hydroxypropylmethylcellulose, hydroxyethylcellulose and similar synthetic cellulose ethers. Other suitable chemically-modified celluloses include such ionic alkylcellulose ethers are carboxymethyl cellulose, carboxymethyl ethyl cellulose, carboxymethyl hydroxyethyl cellulose and their water-soluble salts. The term "chemically-modified polysaccharides" as used herein also refers to semi-synthetic hydrocolloids such as hydroxypropyl alginates and hydroxypropyl starch.

5. Optional Ingredients

The water-in-oil emulsion filling of the present invention is an effective and protective carrier for sensitive ingredients which are deleterious to the dough structure. Deleterious ingredients, such as water, sugars, and acidulants are those that have the ability to reduce the stability of the dough system throughout processing, shelf-life, or preparation. For example, acidulants cause an early release of carbon dioxide from the soda leavening system resulting in package failure or low specific volume in the baked product. Sugar, and other hygroscopic ingredients, draw moisture from the dough through hydration or by creating a solute concentration differential at the dough/filling interface. This moisture migration, in turn, yields an undesirable, runny, syrup-like layer. An aqueous phase in direct contact with dough leads to carbon dioxide migration from the dough, resulting in a low volume product, a bubbly filling, and possibly, package failure.

In the emulsion filling of the present invention, the aqueous phase, as the dispersed phase, is sequestered and kept away from dough contact by the fat phase, which is the continuous phase. Ingredients such as acids, water-soluble flavors, and sugars, may be safely formulated into the filling via dispersion or solution in the aqueous dispersed phase.

Thus, the emulsion filling of the present invention may optionally comprise a variety of adjuvant materials to modify the nutritional, organoleptic, or other properties of the product. For example, the present water-in-oil emulsion filling may optionally further include sugar replacers or bulking agents. Additionally, synthetic and natural flavorings or coloring agents may be utilized in the water-in-oil emulsion fillings of the present invention. Exemplary flavors include spices, cream or cream cheese flavor, milk powder, chocolate, vanilla extract, vanilla powder, cocoa substitute, hazelnut, dutched cocoa, mint, lemon, orange and mixtures thereof. Also, flavor materials and particulates, such as fruit and fruit extracts, nuts, chocolate and other types of flavored chips and the like, can be added to the emulsion filling as desired.

Other additives can be present in the water-in-oil emulsion fillings of the present invention. They include, for example: salt; whiteners, such as titanium dioxide; mold inhibitors, such as potassium sorbate, sorbic acid, dehydroacetic acid, sodium benzoate, and the like; sequestering agents; acidulants; buffers; food acids; preservatives; antioxidants, such as butylated hydroxytoluene, butylated hydroxyanisole, and the like; as well as vitamins and minerals.

Sequestering agents are often used to control the concentration of radical species (e.g., $Cu^{++}$, $Fe^{++}$), which can have a deleterious effect on the color of the emulsion filling. A common sequestering agent is an alkali metal pyrophosphate, such as sodium acid pyropliosphate.

Acidulants, such as citric, acetic, tartaric and phosphoric acids can also provide pH control, and function in other capacities as well. For example, citric acid, in addition to being useful for pH control, can also be used to activate potassium sorbate for mold control, to counter the alkalinity of cocoa used in a chocolate formulation, and to impart a tart flavor to the emulsion filling. As used herein, the term "sugar(s)" is meant to include any of a variety of edible oligosaccharides having one, two or more saccharide groups, e.g., sucrose, fructose, maltose, lactose, galactose, sorbitol, and mixtures thereof. These oligosaccharides can be used in any of a variety of conventional forms, such as cane sugar, beet sugar, corn syrup, corn syrup solids, brown sugar, maple sugar, maple syrup, honey, molasses, and invert sugar. Preferably the sugar utilized is selected from the group consisting of sucrose, fructose, dextrose, maltose and mixtures thereof. More preferably, the sugar is sucrose.

If sugar is to be utilized in the emulsion filling, the total level utilized will be determined by the sweetness level and organoleptic properties desired. Preferably, if sugar is to be present, it will be present at a level of from about 20 to about 80%, more preferably, from about 30 to about 70%, most preferably, from about 40 to 60%.

B. Method of Producing the Water-in-Oil Emulsion Filling

The method of producing the emulsion filling of the present invention is not particularly restricted. That is, the water-in-oil emulsion filling of the present invention may be prepared by mixing or blending in any order, the water, fats, emulsifiers, stabilizer and other additives in such a manner as to achieve a uniform blend.

In an exemplary formulation, the fat phase is prepared first, by melting the high SFI fat or alternatively, by melting the blend of low and high SFI fats and blending them together. The low HLB emulsifier is then added to the fat phase. The aqueous phase is then prepared by combining the water, the high HLB emulsifier and the stabilizer to form a dispersion. The water can be at room temperature, but it is preferably at a temperature of about 70° F. to about 110° F. The aqueous phase is then generally blended into the fat phase until a relatively uniform emulsion is achieved. Sugar can be added to either the fat phase or the aqueous phase, or to the emulsion resulting from combining the fat and aqueous phases, depending on desired texture. Flavorings or other optional ingredients can be added to the emulsion with high agitation until the mixture is thoroughly dispersed and a relatively uniform blend is achieved. The emulsion filling is then allowed to cool prior to packaging.

Preferably, the stabilizer is preblended with an amount of sugar equal to about one-third of its weight prior to being added to the aqueous phase. This aids the dispersion of the stabilizer throughout the emulsion filling. Additionally, it is preferred that the optional ingredients be preblended with the fat prior to the preparation of the fat phase as described hereinabove. In this manner, these ingredients become "enrobed" with the fat, and their contact with the aqueous phase is minimized, thereby providing a more stable emulsion filling.

C. Dough Products

When a dough product is prepared comprising the water-in-oil emulsion filling of the present invention, it has been found that, during use, storage and stability testing, the dough product exhibits substantially fewer and/or lessened undesirable characteristics due to product degradation at the interface of the emulsion filling and the dough surface. In particular, even though high moisture is present in the emulsion filling, there is no substantial moisture migration of any significance; there is no substantial color degradation of the emulsion filling; and there is little to no sogginess in the dough product that is filled. Importantly, structural integrity is also preserved, with very little or no filling leakage exhibited.

As discussed hereinabove, dough products suitable for use in the present invention include any dough product that is typically filled and wherein it is desirable to achieve a greater shelf life and/or product stability of the dough product. For example, the dough product of the present invention may be a doughnut, a Danish, a toaster pastry, a sweet roll, a Bismarck, a cookie, a bagel, a biscuit, a scone, a dinner roll, a loaf of French bread, a croissant, an egg twist, a bread stick, and the like. Furthermore, the dough product may be unbaked dough that is frozen (i.e. below 25° F.), refrigerated (i.e., from about 35° to about 45° F.), or fresh (at ambient temperature), or, alternatively, the dough product may be baked dough that is subsequently frozen or refrigerated, or served fresh.

Formulations of each of the above listed dough products are well known to those of skill in the art, and are readily available to the public in commercial cookbooks. For example, *Beard on Bread*, incorporated herein by reference, contains at least one exemplary formulation for many of the above listed dough products. Beard, *Beard on Bread*, Ballantine Books, NY (1973). An exemplary formulation for breakfast rolls, i.e., Danish rolls, is disclosed in Example 3, hereinbelow. An exemplary formulation for a laminated pastry is disclosed in U.S. Pat. No. 4,612,198. Additional exemplary formulations, i.e., for cookies, cakes and cupcakes, may be found in *The Basics Cookbook*, J. Russo and S. Lukins, Workman Publishing, New York, N.Y. 1989.

Generally, the dough products suitable for use with the present emulsion filling are composed with the usual ingredients known to those of skill in the art, e.g., flour, water, yeast and/or chemical leavening, and salt. In addition to these basic ingredients, the dough products may contain sugar, non-fat milk solids, fat, gums, surfactants and film-forming proteins. The dough products may further comprise effective amounts of adjuvants such as flavorings, thickeners (e.g., starches and hydrophilic colloids), nutrients (e.g., carbohydrates, proteins, lipids, etc.), antioxidants, antimicrobial agents, eggs and egg solids, acidulants, dough conditioners and enzymes, emulsifiers such as mono and diglycerides, sodium stearoyl lactylate, vitamins, and the like. Nonfat milk solids which can be used in the dough products include the solids of skim milk and include proteins, mineral matter and milk sugar. Other proteins such as casein, sodium caseinate, calcium caseinate, modified casein, sweet dairy whey, modified whey, and whey protein concentrate can also be used in these doughs.

Dry or liquid flavoring agents, meat, fish, fruits and vegetables may also be added to the dough products. These include mustard, potatoes, anchovies, capers, olives, bacon, cocoa, vanilla, chocolate, butter flavor, coconut, peppermint, pineapple, cherry, nuts, spices, salts, poppy or sesame seeds, onion, garlic, cheese, tomatoes, scallions, oat bran, jalapeno peppers, cinnamon, raisins, chocolate chips, apples, berries, bananas, walnuts, lemon and flavor enhancers, among others.

Acidulants commonly added to foods include lactic acid, citric acid, tartaric acid, malic acid, acetic acid, phosphoric acid, and hydrochloric acid.

Dough conditioners commonly added to dough products include potassium sorbate, L-cysteine hydrochloride, mono and diglycerides, polysorbates, sodium bisulfite, sodium stearoyl lactylate, ascorbic acid and diacetyltartaric acid esters of mono- and diglycerides. These conditioners serve to add functionality, reduce mix times and provide softness to the doughs to which they are added.

The mixing times, temperatures and speeds for processing the dough products are known in conventional dough processing technology, and vary depending on the particular product being prepared. Particular mixing times, temperatures and speeds for particular dough products can be readily determined by one skilled in the art using conventional processing technology.

EXAMPLE 1

Preparation of cinnamon-flavored water-in-oil emulsion filling.

A cinnamon-flavored emulsion filling was prepared according to the formulation listed on Table 3, hereinbelow

TABLE 3

Cinnamon-Flavored Water-in-Oil Emulsion Filling Formulation

| Ingredients | Fat Phase % | Aqueous Phase % | Emulsion Filling with Cinnamon |
|---|---|---|---|
| Fat | 85.51 | | |
| Mono and diglycerides | 14.49 | | |
| Water | | 95.60 | |
| Xanthan gum | | 2.05 | |
| Polysorbate 60 | | 2.35 | |
| Sucrose | | | 43.95 |
| Cinnamon | | | 6.80 |
| Soybean Oil | | | 4.00 |
| Fat Phase | | | 26.25 |
| Aqueous Phase | | | 19.00 |
| Total (%) | 100.00 | 100.00 | 100.00 |

The base formulation was formulated by first preparing the fat phase. Specifically, the fat and mono- and diglycerides were melted in a kettle at approximately 120° F. and blended. The mixture was transferred to a blender vase. In a separate container, the xanthan gum was pre-blended with a small amount of sucrose. The aqueous phase was prepared by placing 90° F. water and the Polysorbate 60® into a separate blender vase. With the blender set on medium shear the xanthan gum was gradually added until blended until dispersed. Finally, with the blender containing the fat phase set on high shear, the aqueous phase was gradually added to the melted fat phase, thus completing the preparation of the base emulsion.

The dry ingredients, i.e., the sugar and the cinnamon, were then pre-blended in a separate vessel. With the blender containing the base emulsion operating at high shear, the cinnamon/sugar blend was gradually added. The resulting emulsion filling was transferred to a container and allowed to cool at room temperature.

EXAMPLE 2

Water-in-oil emulsion filling as a carrier for dough antagonistic ingredients

A fruit based, moist emulsion filling was prepared according to the formulation listed in Table 4, hereinbelow. Concentrated orange juice is a suitable example of a dough antagonistic ingredient, i.e., it has high sugar and acid content (pH 3.8) present in an aqueous media.

TABLE 4

Orange-Flavored Water-in-Oil Emulsion Filling Formulation

| Ingredients | Fat Phase | Aqueous Phase | Emulsion Filling with Orange Juice |
|---|---|---|---|
| Fat | 84.10 | | |
| Mono and diglycerides | 15.90 | | |
| Orange Juice, concentrated | | 67.04 | |
| Xanthan gum | | 1.26 | |
| Polysorbate 60 | | 1.32 | |
| Sucrose | | 29.54 | |
| Flavors | | 0.84 | |
| Fat Phase | | | 43.84 |
| Aqueous Phase | | | 56.16 |
| Total (%) | 100.00 | 100.00 | 100.00 |

The base emulsion was formulated by first preparing the fat phase. Specifically, the fat and mono- and diglycerides were melted in a kettle at approximately 120° F. and blended. The mixture was transferred to a blender vase. In a separate container, the xanthan gum was pre-blended with a small amount of the sugar. The aqueous phase was prepared by placing the orange juice (at approximately 70° F.), sucrose, flavors, and the Polysorbate 60® into a separate blender vase. With the blender set on medium shear, the xanthan gum was gradually added to the orange juice/Polysorbate 60®/sucrose blend until the xanthan gum was blended until dispersed. Finally, with the blender containing the fat phase set on high shear, the aqueous phase was gradually added to the melted fat phase, thus completing the preparation of the emulsion filling. The resulting emulsion filling was transferred to a container and allowed to cool at room temperature.

The resulting emulsion filling had a creamy, glossy, whitish appearance, with orange color and good orange flavor.

EXAMPLE 3

Shelf life of water-in-oil emulsion fillings.

The following study was conducted to demonstrate the shelf-life stability of rolled dough products, i.e. breakfast rolls containing an orange flavored water-in-oil emulsion filling. Specifically, the dough products were made with the following fillings:

1) Water-in-oil emulsion filling with sugar in the aqueous phase;
2) Water-in-oil emulsion filling with sugar in the fat phase;
3) Non-emulsified aqueous filling; and
4) Non-emulsified fat-based (non-aqueous) filling.

The filling formulas are described in Table 5, hereinbelow.

Once prepared and filled with the fillings enumerated hereinabove, the dough products were packed into conventional refrigerated dough cans and put into 45° F. storage. The dough products were evaluated initially and throughout a period of 15 weeks at refrigeration temperatures.

TABLE 5

Non-Emulsified Filling vs Water-in-Oil Emulsion Fillings
as Carriers for Dough Antagonistic Ingredients

| Ingredients | W/O Emulsion Filling (Sugar in Aqueous Phase) | | | W/O Emulsion Filling (Sugar in Fat Phase) | | | Non-Emulsified | Non- |
|---|---|---|---|---|---|---|---|---|
| | Fat Phase | Aqueous Phase | Emulsion Filling | Fat Phase | Aqueous Phase | Emulsion Filling | Aqueous Filling | Emulsified Fat Filling |
| Fat | 84.1 | | | 61 | | | 1.6 | 45 |
| Mono and diglycerides | 15.9 | | | 11.5 | | | | |
| Orange Juice conc | | 67 | | | 95.1 | | 19.2 | |
| Xanthan gum | | 1.3 | | | 1.8 | | 0.05 | |
| Polysorbate 60 | | 1.3 | | | 1.9 | | | |
| Sucrose | | 29.6 | | 27.5 | 1.2 | | 59.7 | 54.5 |
| Flavors | | 0.8 | | | | | 0.65 | 0.5 |
| Fat Phase | | | 43.8 | | | 60.4 | | |
| Aqueous Phase | | | 56.2 | | | 39.6 | | |
| Corn Syrup | | | | | | | 14.8 | |
| Pregel Corn Starch | | | | | | | 4 | |
| Total (%) | 100 | 100 | 100 | 100 | 100 | 100 | 100 | 100 |

Dough products containing either water-in-oil emulsion filling were superior when compared with the dough products containing the non-emulsified fillings. Specifically, throughout the testing period (15 weeks), dough products with water-in-oil emulsion fillings maintained soft fillings with a creamy, glossy, moist appearance that stayed intact within the unbaked dough product. The water-in-oil emulsion fillings themselves, upon inspection, did not appear wet or slimy, and furthermore, did not spill out of the dough product upon baking. Dough products with water-in-oil emulsion fillings produced baked dough products of acceptable baked product height and appearance when tested at intervals throughout the testing period of 15 weeks.

In contrast, dough products containing the non-emulsified aqueous filling were slimy and foamy, very wet, and difficult to handle when unbaked. Furthermore, the non-emulsified aqueous filling boiled out of the rolls upon baking.

Dough products containing the non-emulsified fat-based filling presented no handling difficulties when tested as raw dough products. Dough products containing the non-emulsified fat-based fillings produced baked dough products of acceptable baked product height. However, appearance of the baked dough products containing the non-emulsified fat-based filling was inferior as compared to the baked dough products containing the water-in-oil emulsion fillings of the present invention. Specifically, the non-emulsified fat-based filling disappeared after baking, becoming invisible on the baked dough products.

This Example confirms that refrigerated dough products comprising the waterin-oil emulsions of the present invention, even when the emulsion comprises a dough-antagonist such as orange juice, are stable throughout 15 weeks of storage at 45° F. The appearance of the emulsion filling in the dough products were acceptable, and the emulsion fillings maintained a moist, jelly-like texture.

EXAMPLE 4

Viscosity comparison of non-emulsified and emulsion based cinnamon fillings.

Cinnamon flavored emulsion-based fillings of the present invention were prepared as described in Example 1, using the following fat blends for the continuous phase:

75% high SFI fat, 25% low SFI fat
85% high SFI fat, 15% low SFI fat
100% high SFI fat, 0% low SFI fat A non-emulsified fat based cinnamon filling was also prepared as the control. Specifically, the control filling contained 45% high SFI fat, 45% sugar, and 10% cinnamon. The control filling was prepared by melting the fat, adding the sugar and cinnamon, and blending until the filling was homogenous.

The viscosity of each filling was measured over temperatures ranging from 0–60° C. using a Haake Roto 2.3 viscometer, with a MV2 spindle and cup and an M10 torque head. The viscosity measurements are illustrated in FIG. 1.

This Example shows that although the fillings of the present invention are emulsion-based, they have viscosity profiles that closely resemble a non-emulsified fat based filling. Therefore, the fillings of the present invention can be processed and used with conventional filling equipment and require no specialized apparatus for applying the filling to dough products. However, although the fillings of the present invention have viscosity profiles similar to conventional non-emulsified fillings, as described previously, they exhibit substantial improvements in shelf stability and organoleptic properties compared to non-emulsified fillings.

All publications, patents and patent documents are incorporated by reference herein, as though individually incorporated by reference. The invention has been described with reference to specific and preferred embodiments and techniques. However, it should be understood that many variations and modifications may be made while remaining within the spirit and scope of the invention.

What is claimed is:

1. A shaped dough product filled with a spreadable emulsion filling comprising about 5–60% water, about 15–60% of a fat phase, about 0.1–1.5% of an emulsifier having a high HLB, about 1–5% of an emulsifier having a low HLB and about 0.1–1.5% of a stabilizer, and wherein the fat phase comprises about 70–100% of a fat having a high SFI and about 0–30% a fat having a low SFI.

2. The filled dough product of claim 1 wherein the dough is frozen.

3. The filled dough product of claim 1 wherein the dough is refrigerated.

4. The filled dough product of claim 1 wherein the dough is fresh.

5. The filled dough product of claim 1 wherein the dough product is a doughnut, a Danish pastry, a toaster pastry, a sweet roll, a Bismarck, a cookie, a bagel, a biscuit, a scone, a dinner roll, a loaf of French bread, a croissant, an egg twist or a bread stick.

6. The filled dough product of claim 1 wherein said fat having a low SFI and said fat having a high SFI are selected from the group consisting of cottonseed oil, soybean oil, peanut oil, palm oil, corn oil, safflower oil, sunflower seed oil, canola oil and mixtures thereof.

7. The filled dough product of claim 6 wherein the low SFI fat is hydrogenated soybean oil.

8. The filled dough product of claim 7 wherein the high SFI fat is a hydrogenated, votated, blend of soybean and cottonseed oils.

9. The filled dough product of claim 1 wherein the low HLB emulsifier is an unmodified monoglyceride, a mono and diglyceride blend, triglycerol monostearate, a sorbitan ester, a propylene glycol fatty acid ester or lecithin.

10. The filled dough product of claim 9 wherein the low HLB emulsifier is a mono- and diglyceride blend.

11. The filled dough product of claim 1 wherein the high HLB emulsifier is an ethoxylated monoglyceride, a polysorbate, an ethoxylated sorbitan or decaglycerol dipalmitate.

12. The filled dough product of claim 11 wherein the high HLB emulsifier is a polysorbate.

13. The filled dough product of claim 1 wherein the stabilizer is a hydrophilic colloid.

14. The filled dough product of claim 13 wherein the stabilizer is a starch, a gum, or a chemically-modified polysaccharide.

15. The filled dough product of claim 14 wherein the stabilizer is a natural gum.

16. The filled dough product of claim 15 wherein the stabilizer is xanthan gum.

17. The filled dough product of claim 1 wherein said emulsion filling further comprises a dough antagonist selected from the group consisting of sugar, fruit, flavorings, fruit juice and spices.

18. The filled dough product of claim 17 wherein the dough antagonist is a spice.

19. The filled dough product of claim 18 wherein the dough antagonist is cinnamon.

20. A dough product comprising
   (a) a dough; and
   (b) a shelf-life enhancing emulsion filling, said emulsion filling having a viscosity of from about 5,000 to about 40,000 millipascals at 20° C. and comprising an aqueous phase dispersed in an oil phase, said aqueous phase comprising a water-soluble dough antagonist;
   wherein the oil phase provides a shelf-life enhancing barrier between the aqueous phase and the dough that inhibits migration of at least the dough antagonist from the aqueous phase into the dough.

21. The dough product of claim 20, wherein the emulsion filling has a viscosity of from about 10,000 to about 30,000 millipascals at 20° C.

22. The dough product of claim 20, wherein the dough antagonist is selected from the group consisting of sugar, fruit, flavorings, fruit juice and spices.

23. The dough product of claim 22, wherein the dough antagonist is a spice.

24. The dough product of claim 23, wherein the dough antagonist is a cinnamon.

25. The dough product of claim 20, wherein the dough is refrigerated.

26. The dough product of claim 20, wherein the dough is frozen.

27. The dough product of claim 20, wherein the dough is fresh.

28. A spreadable water-in-oil emulsion filling comprising about 15%–60% water, about 15–60% of a fat phase, about 0.1–1.5% of an emulsifier having a high HLB, and about 1–5% of an emulsifier having a low HLB and about 0.1–1.5% of a stabilizer, and wherein the fat phase comprises about 70–100% of a fat having a high SFI and about 0–30% of a fat having a low SFI.

29. The emulsion filling of claim 28 wherein said fat having a low SFI has a melting point of about 50°–55° F.

30. The emulsion filling of claim 28 wherein said fat having a high SFI has a melting point of from about 120°–130° F.

31. The emulsion filling of claim 28 wherein said fat having a low SFI and said fat having a high SFI are both vegetable fats.

32. The emulsion filling of claim 31 wherein said fat having a low SFI and said fat having a high SFI are selected from the group consisting of cottonseed oil, soybean oil, peanut oil, palm oil, corn oil, safflower oil, sunflower seed oil, canola oil and mixtures thereof.

33. The emulsion filling of claim 32 wherein the low SFI fat is hydrogenated soybean oil.

34. The emulsion filling of claim 32 wherein the high SFI fat is a hydrogenated, votated, blend of soybean and cottonseed oils.

35. The emulsion filling of claim 28 wherein the combined amount of said emulsifiers is about 1–10%.

36. The emulsion filling of claim 28 wherein the ratio of the high HLB emulsifier to low HLB emulsifier is about 1:10.

37. The emulsion filling of claim 28 wherein the low HLB emulsifier is an unmodified monoglyceride, a mono and diglyceride blend, triglycerol monostearate, a sorbitan ester, a propylene glycol fatty acid ester or lecithin.

38. The emulsion filling of claim 37 wherein the low HLB emulsifier is a mono- and diglyceride blend.

39. The emulsion filling of claim 28 wherein the high HLB emulsifier is an ethoxylated monoglyceride, a polysorbate, an ethoxylated sorbitan or decaglycerol dipalmitate.

40. The emulsion filling of claim 39 wherein the high HLB emulsifier is a polysorbate.

41. The emulsion filling of claim 28 wherein the stabilizer is a hydrophilic colloid.

42. The emulsion filling of claim 41 wherein the stabilizer is a starch, a gum, or a chemically-modified polysaccharide.

43. The emulsion filling of claim 42 wherein the stabilizer is a natural gum.

44. The emulsion filling of claim 43 wherein the stabilizer is xanthan gum.

45. The emulsion filling of claim 28 further comprising a dough antagonist selected from the group consisting of sugar, fruit, flavorings, fruit juice and spices.

46. The emulsion filling of claim 45 wherein the dough antagonist is a spice.

47. The emulsion filling of claim 46 wherein the dough antagonist is cinnamon.

* * * * *